(12) United States Patent
Mäkipää

(10) Patent No.: US 7,953,407 B1
(45) Date of Patent: May 31, 2011

(54) CENTRALIZED MANAGEMENT OF TELECOMMUNICATIONS PARAMETERS

(75) Inventor: Risto Mäkipää, Otava (FI)

(73) Assignee: Domiras Oy (FI)

( * ) Notice: Subject to any disclaimer, the term of this patent is extended or adjusted under 35 U.S.C. 154(b) by 2112 days.

(21) Appl. No.: 09/604,596

(22) Filed: Jun. 27, 2000

(30) Foreign Application Priority Data

Jun. 28, 1999 (FI) .......................................... 991464
May 10, 2000 (FI) ...................................... 20001112

(51) Int. Cl.
*H04W 4/00* (2009.01)
*H04K 3/00* (2006.01)

(52) U.S. Cl. ................ 455/426.1; 455/435.2; 455/552.1

(58) Field of Classification Search ............... 455/426.1, 455/435.2, 456.3, 525, 552.1
See application file for complete search history.

(56) References Cited

U.S. PATENT DOCUMENTS 5,901,352 A * 5/1999 St-Pierre et al. ............... 455/426
6,230,009 B1 * 5/2001 Holmes et al. ................ 455/426

FOREIGN PATENT DOCUMENTS

WO WO01/01712 * 2/2001

* cited by examiner

*Primary Examiner* — Lee Nguyen
(74) *Attorney, Agent, or Firm* — McDonnell Boehnen Hulbert & Berghoff LLP

(57) ABSTRACT

A method of managing telecommunications parameters in a telecommunications system which comprises base transceiver stations of several wireless telecommunications networks and a terminal which is capable of establishing a wireless data transmission connection to said base transceiver stations wherein the base transceiver stations are connected to a fixed network which comprises a server for storing services and telecommunications parameters transmitted by the base transceiver stations of the telecommunications networks.

49 Claims, 2 Drawing Sheets

CENTRALIZED MANAGEMENT OF TELECOMMUNICATIONS PARAMETERS

BACKGROUND OF THE INVENTION (1) Field of the Invention

The invention relates to centralized management of telecommunications parameters in various wireless telecommunications networks and to their distribution to terminals in the various networks.

(2) Description of the Art

As wireless data transmission advances, more and more services are transferred to be performed through different wireless networks. Technical limitations of wireless data transmission are the reason for the fact that for different services, different types of networks have typically been developed. For instance, it is sensible to technically implement wide-band wireless data transmission directed to one terminal as a short-range network only. To utilize the services in each network, several network-specific applications have typically been developed, the applications being typically available only on terminals designed specifically for the network. In addition, interfaces between the terminals and the various network elements have typically been designed specifically for each network. Lately, the trend to converge various fixed and wireless services has brought about new solutions for, integrating the different terminals. It is, for instance, possible to receive digital broadcasting services, such as digital audio broadcasting (DAB) or digital video broadcasting (DVB) by means of an additional card connected to a personal computer (PC). Solutions are also known, in which a computer and a wireless local area network (WLAN) interface card have been connected to the same terminal. Solutions have also been developed for connecting a WLAN card to a mobile station of a cellular radio network, such as the GSM network.

The convergence of different telecommunications networks and services and integration of terminals makes it possible to receive the services provided traditionally by a certain network also through another network. For instance, receiving digital radio and TV broadcasts on a computer through an Internet connection is possible by means of the above-mentioned interface cards. Correspondingly, connecting a wide-band WLAN card to a mobile station makes it possible to receive video images through a conventional mobile station. A tendency can clearly be seen in the development, in which the services provided by various networks will in the future be provided through the Internet either by wire or wirelessly.

According to prior art, when a user of a terminal wants to use a service provided by a wireless telecommunications network, he first selects the network through which he wants to establish a connection to the service provider. In addition, in some cases the user of a terminal can define certain telecommunications parameters, such as the data transmission rate to be used, in which case the use of a higher data transmission rate naturally costs more. In addition, various telecommunications settings have typically been defined for a user of a terminal by service providers of each network, the settings defining the telecommunications parameters used in the data transmission connection between the terminal and the network, for instance, and service settings which define the services that the user has ordered and to which the user has registered. A user of a terminal can thus have one set of telecommunications and service settings within the mobile network, a second set of settings within the wireless local area network and a third set within the digital radio network.

A problem with the arrangement described above is that despite the fact that an integrated terminal provides a possibility to receive services through different networks, the user of the terminal must select the desired network and telecommunications parameters to be used. A mobile user of a wireless terminal must then have information on the wireless networks available in each area and the values of the telecommunications parameters enabled by them. Connecting to different network environments is to a large extent dependent on the know-how of the terminal user, and the network services do not support the configuration of the customer's terminal to teleservices of various networks and through them, to content services.

It is, for instance, an aim in the standardization of third-generation (3G) mobile systems to identify the requirements and technical specifications of the radio interface, with which the requirements of a telecommunications connection can be met through the same technical access technology (technical specifications of the air interface) in all environments, such as rural and urban areas, and indoors, such as corporate and home environments. One such 3G system is the Universal Mobile Telecommunications System (UMTS) and its radio access network, the UMTS Terrestrial Radio Access Network (UTRAN). In defining the UTRAN, several propositions have been made for the specifications of a uniform radio interface. The propositions differ from each other mainly in the many access technologies. Such network access technologies include the FDMA (Frequency Division Multiple Access), TDMA (Time Division Multiple Access) and CDMA (Code Division Multiple Access). All propositions are based on a combination of various technologies. These combination.are compared with the radio network requirements and the final decision on the technology to be used will be based on the results of these comparisons. It seems, however, that several different radio access technologies will be taken into use. For this reason, solutions which enable roaming between different (local) solutions have also been examined. One suggestion was to standardize a common global broadcasting channel which indicates to a mobile terminal which air interface technology (radio interface) is used in each environment. The differences in mobile systems can thus also cause the problems described above for a terminal and a user.

SUMMARY OF THE INVENTION

It is thus an object of the invention to reduce or solve the above-mentioned problems. The object of the invention is achieved by a method of managing telecommunications parameters in a telecommunications system which comprises nodes of at least two different wireless telecommunications networks and a terminal which is arranged to establish a wireless data transmission connection to said nodes, which method is characterized by connecting said nodes of at least two different wireless telecommunications networks to a fixed network which comprises a server for storing the services and telecommunications parameters provided by said nodes of telecommunications networks, making a service request from said terminal through one of said nodes to said server, and transmitting to the terminal the telecommunications parameters of the node providing the service of the service request.

The invention also relates to a telecommunications system according to claim 17, a server according to claim 33, a terminal according to claim 36, and a server according to claim 48.

Preferred embodiments of the invention are disclosed in the dependent claims.

The invention is based on managing in a centralized manner the services and telecommunications parameters of various wireless telecommunications networks by means of a server or a fixed network, to which server or fixed network nodes providing services of various wireless networks in a certain area are connected. An integrated terminal capable of establishing a connection to several wireless networks can through a wireless network make service requests to the server or fixed network which returns to the terminal the telecommunications parameters of the node of the wireless network supported by the terminal and providing the desired service. With these telecommunications parameters, the terminal is able establish a connection to the desired service.

The method and system of the invention provide the advantage that the invention significantly facilitates the configuration of an integrated terminal to various wireless networks and the services provided through them. A user of a terminal does not need to know the wireless networks available in the area or their configuration data. A further advantage is that the terminal can be automatically configured to the desired service.

Telecommunications parameters preferably also contain the quality properties, such as connection quality parameters and their limit values, of the service provided in the node. This way, it is possible to select the most suitable node for each purpose. The terminal configures itself and selects the settings of the connection according to the connection quality properties. In multimedia applications, for instance, it is necessary to utilize different types of access networks and to scale the connections to the requirements of the multimedia presentation format. The quality of the data transmission connection required by the application typically depends on the fault-tolerance of the application and, on the other hand, on its transmission delay-tolerance. The delay-tolerance of a video call and speech transmission application, for instance, is low, whereas the delay-tolerance of file transfer is high. In program file transfer, for instance, fault-tolerance is often low, but in speech transmission, more errors can be tolerated without the intelligibility suffering from them. Applications generally define what type of a data transmission connection is needed, for instance a wide-band connection through a wireless local area network or a narrower band connection through a mobile network.

In an embodiment of the invention, the received telecommunications parameters are used to initialize or configure negotiation protocols of the connection quality (QoS, quality of service) of the terminal. QoS negotiation protocols use program processes operating in networks and terminals, which, to fulfil the data transmission needs of the application in question, negotiate using the data transmission parameter values with the telecommunications network node the connection properties required by the application, which negotiate the connection parameters with the wireless network node.

In an embodiment of the invention, communication between the terminal and the server and preferably between the nodes and the server is based on a data transfer protocol independent of said wireless telecommunications networks, such as the Internet protocol (IP). This way, information on all available network services and . their telecommunications parameters can be found and the terminal can be initialized regardless of the access technology of the network services. More and more services of telecommunications networks are IP-based and most networks and terminals will support the IP protocol. This is why implementing the management of the telecommunications parameters according to the invention in an IP environment is especially advantageous and enables a flexible expansion to new networks.

In a preferred embodiment of the invention, telecommunications parameters are also used to form a connection request sent to a node when a connection is established. In a connection request, the quality requirements of the connection can be presented in the form of a special QoS profile. This profile can be based on a node quality profile transmitted by a server and modified as necessary by a user or application.

In yet another embodiment of the invention, the connection quality negotiation between the terminal and the node is also performed using a universal negotiation protocol independent of said wireless telecommunications networks, such as an IP-based protocol. This way, the terminal can manage the quality parameters of the connection with one negotiation protocol regardless of the access network through which the connection is established. In such a case, the negotiation protocol just selects the most suitable network and the interface card or module corresponding to it. This provides a universal way of managing connection settings when the connection is established and of negotiating during the time of the connection the capacity need and other quality parameters for the connection as required by the application.

In yet another embodiment of the invention, the configuration of the terminal comprises the configuration of a radio access part of the terminal and/or protocol units to the radio interface of the new wireless telecommunications network with parameters and/or configuration programs which are loaded from the network server at a higher protocol level before accessing said new telecommunications network. According to the basic principles of the invention, the terminal receives from said centralized server, according to the telecommunications parameters, connection information to the server of the desired telecommunications network where configuration programs and/or parameters are stored, with which the terminal configures itself to operate in the radio interface of the new network. By means of this connection information, the terminal establishes a higher protocol level connection, typically an IP connection, through some other network than said new network to the server in question and downloads the necessary programs and/or parameters. Then, the terminal configures itself to the radio interface by means of the downloaded programs and/or parameters. The parameters may be similar to the telecommunications parameters in the embodiments described above. In a software-configured terminal, a bandpass filter, for instance, can be implemented digitally by a program which is loaded from the network, or which is configured by means of parameters loaded from the network, or which is selected from a filter bank. Correspondingly, higher-level protocol programs, such as the above-mentioned QoS negotiation program, can be loaded from the network. This kind of a network server is in the new telecommunications network preferably located in the node, such as base station, which will provide network services to the terminal. This way, the invention offers a possibility to establish a higher-level protocol connection to a node of a new telecommunications network through a second (old) telecommunications network and to load data or programs or even negotiate a connection in preparation for the actual access which is executed through the radio interface of the new telecommunications network.

One embodiment of the invention provides the additional advantage that a user of a terminal can make personal settings in the network to prioritize certain networks and telecommunications parameters for certain services. The invention provides the further advantage that installing new network nodes and transmitting services through the nodes to the customers becomes easier for network operators and service providers.

DESCRIPTION OF THE FIGURES

In the following, the invention will be described by means of preferred embodiments, with reference to the attached drawings in which.

DESCRIPTION OF PREFERRED EMBODIMENTS

Figure 1:
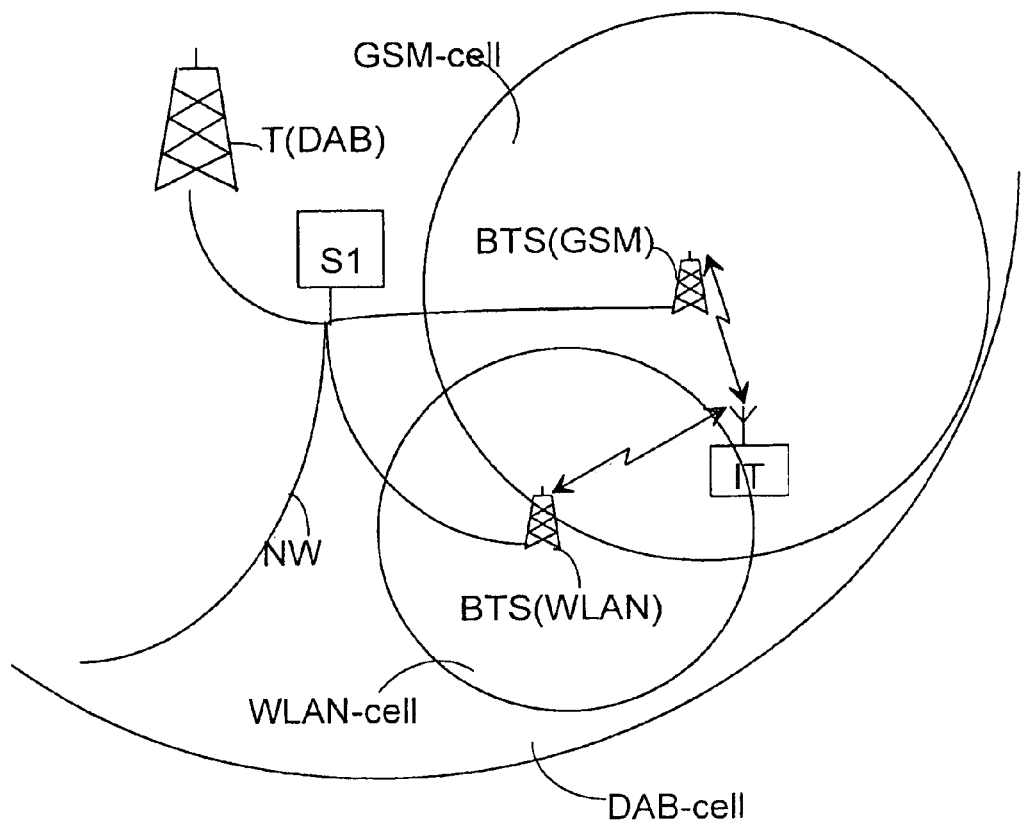
FIG. 1 shows a telecommunications system according to a preferred embodiment of the invention.

In the following, the invention is described in greater detail on the basis of FIG. 1. FIG. 1 shows an integrated wireless terminal IT which is connected to a wireless telecommunications network, such as to a base transceiver station of a cellular radio network BTS(GSM). In the operating area of the terminal IT, there is also a base transceiver station of a wireless local area network BTS(WLAN), and the terminal IT preferably comprises means for a wireless connection to the local area network. The terminal is also preferably arranged to receive digital radio transmissions DAB which are transmitted from a DAB network transmitter TM(DAB) in the operating area of the terminal. The above-mentioned base transceiver stations BTS(GSM) and BTS(WLAN) are preferably transceivers capable of transmitting and receiving messages according to certain data transmission protocols in the coverage area of their cells (GSM cell, WLAN cell), whereas the DAB network base transceiver station is typically a transmitter designed for one-way broadcasting services and transmits different broadcasting services in its coverage area (DAB cell). Said base transceiver stations are connected to a fixed network NW which preferably uses the Internet protocol (IP). The fixed network NW can preferably be a local area network LAN for transmitting services and service data or a wide area network (WAN). The invention can also be implemented in an Internet network, since the number of network nodes formed by the available services does not increase to an uncontrollable extent, because the invention provides a solution for managing wireless telecommunications networks regionally, not within the entire Internet. The fixed network NW preferably comprises at least one server S1 where configuration data of the network and content services transmitted through said base transceiver stations can be stored. In addition, the network NW comprises program means for updating said configuration data in the server S1 and program means for requesting said configuration data by the terminal IT. Said program means are described in greater detail in the following.

Figure 2:
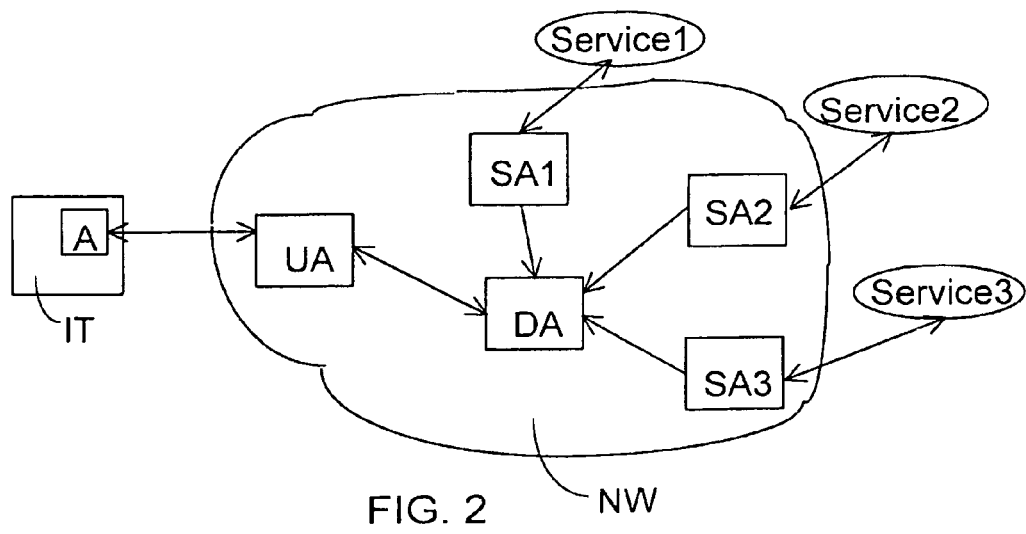
FIG. 2 shows the structure of a service protocol utilized in the invention.

The invention can preferably be implemented by means of a service location protocol (SLP) standardized for an Internet network. The SLP is designed for simplifying the finding and use of various network resources and services. In the first preferred embodiment of the invention, communication is based on the Internet protocol (IP). The SLP is a client-server-based service transmission process based on an agent technology known per se, which enables dynamically associating the services required by a user with the network address providing the service. FIG. 2 shows the structure of the SLP. A user makes a service request with an application A on his terminal IT to a user agent UA in the network, which user agent is a program procedure operating independently on behalf of the user in the network and searches from the network a service according to the attributes defined by the user. Service agents SA in the network are program procedures operating on behalf of one or more services and their task is to bring forth the service data of said services, such as their address and configuration data. A service agent SA may preferably also contain configuration programs and data, which the terminal IT can download through an IP connection, as described below. Directory agents DA collect the service data provided by the service agents SA into one place, whereby the directory agents DA have information on all available services. A directory agent DA acts as a kind of dynamic service portal through which terminals gain access to the services they want.

When wanting to use a certain service through a wireless network, a user makes a service request with an application A on his terminal IT to a user agent UA in the network to search for the service data of said service. If the user agent UA knows the address of a directory agent DA, it can make a direct service request (unicast) to the directory agent DA. If the user agent UA does not know the address of a directory agent DA, it can make service requests (multicast) to several addresses of service agents SA specified for each service. The service agents SA register the service data of the services they comprise at the directory agent DA which acknowledges the received data. The service agents SA must register and update their service data at regular intervals, otherwise the service data is deleted from the directories of the directory agent DA. Service agents SA also inform the directory agent DA if said services are disabled, in which case the directory agent DA deletes the service data of said services from its directories. This way, the directory agents DA always have updated information on the available services. In response to the unicast made by the user agent UA, the directory agent DA checks to see if the directories contain a service according to the service request and sends the service data of the service it has found in its reply to the user agent UA which forwards the address data of said service to the terminal IT. On the basis of the address data, the terminal IT can configure itself to the desired service. Correspondingly, the service agents SA reply to the multicast made by the user agent UA, if the service request corresponds to the service data of the services provided by the service agent SA. This way, the user agent always gets updated information on the address and configuration data of the available services and the terminal can connect to the service at the correct address. The SLP protocol is described in greater detail in the Internet Request for Change RFC2165.

The invention can preferably be implemented by means of the SLP protocol in such a manner that a connection is established from each wireless network to the fixed network NW utilizing the Internet protocol (IP). Each wireless network comprises transceivers acting as base transceiver stations or, in connection with broadcast networks, typically transmitters. Said transceivers and transmitters act as service provision nodes for the terminal and through them the terminal can receive the desired service wirelessly and preferably also make service requests to service providers in different networks. According to the invention, a network address, preferably an IP address, is defined in the fixed network NW for all transceivers and transmitters of networks providing wireless services in a certain area. Said network addresses are stored in the directory agent DA according to the SLP protocol. In addition to the network address, preferably also the services (e.g. service identity or name) available through the wireless networks in question are stored in the directory agent DA, as well as the connection quality (QoS) parameters associated with the services and their ranges or limit values, and the telecommunications parameter values of the transceivers and transmitters, needed for establishing a wireless connection between the terminal and the network. In addition, it is possible to store in the directory agent DA the address of the agent server SA or that of another IP server of a wireless access network, from which address the terminal IT can download configuration programs and/or data. In the SLP protocol, it is possible to define service type models for storing and finding attributes. The models can be different for various wireless network access technologies. For the software of the terminal, an application, for instance, to be able to search for the services of all kinds of networks with the same service request, the service models must contain general attributes, such as, in the case of the QoS parameters, the allowed bit error ratio, data transmission delay and data transmission capacity, i.e. the basic telecommunications parameters. The parameter range and the possibility to affect the parameter values naturally varies according to the network type and the technical implementation of the node. For each network type, it is also possible to define attributes that are characteristic of this network type only. Correspondingly, nodes, in other words, transceivers and transmitters, of a wireless network providing services have service agents SA which take care of updating the service data of each node in the directory agent DA. Each node can have its own service agent or one service agent can preferably take care of updating the service data of several nodes. Thus, a base station controller BSC of a cellular radio network may have a service agent SA which takes care of updating the service data of all base transceiver stations BTS connected to said base station controller BSC in the directory agent DA. The service agent can preferably also contain configuration programs and data which the terminal IT can download through an IP connection, as described in greater detail below. Further, said fixed network has program procedures for creating user agents UA for wireless terminals IT. Because the terminals IT move in different areas, it is not sensible to create permanent user agents for each terminal in a limited area, but the terminals register at the user agent each time they arrive in the area defined by the directory agent DA. When a terminal is registered at a user agent UA, the user of the terminal can make service requests through the user agent UA to the directory agent DA.

Figure 3:
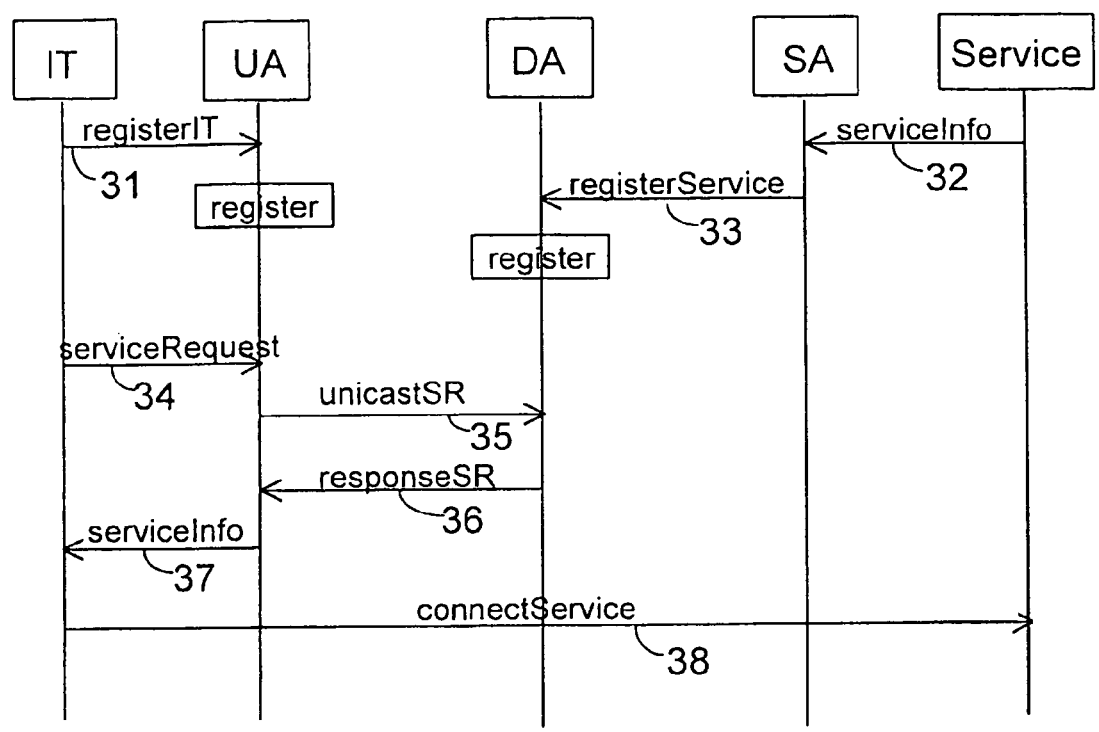
FIG. 3 shows, by means of a signalling diagram, the establishment of a telecommunications connection according to the invention.

In the following, connection establishment of the invention from a terminal to a desired service provided by a wireless network is described by way of example using the signalling diagram of FIG. 3. When an integrated wireless terminal IT moves according to the invention in the area of wireless networks managed by a fixed network NW, a connection is preferably established from the terminal to a wireless network, such as a cellular radio network. The terminal IT registers (registeriT, 31) itself through said cellular radio connection at a user agent UA in the fixed network, and during the registration, the necessary identification data of the terminal IT are transmitted to the user agent. Correspondingly, different services (service) transmit their service data (serviceInfo, 32) to service agents SA which register (registerService, 33) said service data at a directory agent DA. This can take place before or after the terminal IT registers at the user agent UA. In addition, various services (service) may also store configuration programs and data in the service agent SA for the terminal IT to download through an IP connection, as described in greater detail below. The user of the terminal IT tries to establish a connection to a certain service by transmitting a service request (serviceRequest, 34) to its user agent .UA in the network. The user of the terminal does not need to know any specific information on the service, such as at which network address the service is available or the telecommunications parameters to be used. The user of the terminal can define in the service request different attributes of the desired service, such as the service type, network protocols supported by the terminal or with which it is advantageous to receive the service and possible connection quality parameters. In the service request, the approximate location of the terminal is preferably also specified based on the location of the node through which the terminal has connected to the fixed network NW. The location can also be more exact, for instance a location received from a GPS device connected to the terminal or from a corresponding positioning system. The location information is used to select a service in the directory agent. The user agent UA transmits the service request (unicastSR, 35) defined by the user of the terminal preferably to the directory agent DA which searches for a service description defined in said service request from the services registered by different service agents SA at the directory agent DA. If a service according to the service request is available through a requested wireless network connection or one supported by the terminal in the location area of the terminal, the directory agent DA returns (responseSR, 36) to the user agent UA the service data of said service(s). The user agent UA transmits the data on (serviceInfo, 37) to the terminal IT which is able to establish the connection (connectService, 38) to the network providing the service and to the desired service preferably by means of the received telecommunications parameters.

This way, it is possible to easily utilize the properties of an integrated wireless terminal for receiving services through several wireless networks without the user of the terminal needing to have knowledge of the networks available in his location area or their properties and the telecommunications parameters required for establishing a connection. The user of the terminal may, for instance, want to receive a wireless video service which is more sensible to receive through a wide-band wireless network than through a cellular radio network, for instance. In such a case, the user of the terminal can make a service request in which he defines the desired video service and, as the network providing the service, one of the networks supported by the terminal, for instance a wireless local area network WLAN or a digital radio DAB. A limited number of time-slots have been standardized in the multiplex frame of DAB transmissions for providing various on-demand services in the multiplex of DAB broadcasting services. In such a case, if the directory agent DA detects a network (WLAN or DAB) according to the service request made by the user agent UA in the location area of the terminal IT, which network is able to provide said video service for terminals, the directory agent DA transmits the service data of said service through the user agent UA to the terminal IT which is then able to connect to said service on the basis of the received data. If the desired service can be provided through several networks and nodes, these alternatives are preferably shown in the interface of the terminal to the user who can preferably select the desired service provider.

. The use of the attributes sent by the directory agent DA can in the terminal be integrated with the procedures of the software supporting the applications. The terminal can be equipped with a network management protocol, such as the Usage Parameter Control (UPC) protocol used in ATM (AsynchronouS Transfer Mode) networks, or a corresponding protocol. More generally, it is possible to speak about QoS negotiation protocol software, using which the terminal negotiates with the selected network on the parameters of the transmission path. Such a QoS negotiation software is configured according to the terminal attributes received from a directory agent DA. After the configuration, the QoS negotiation software uses in its protocol messages only the quality parameter values which the network node supports and only within the limit values within which the telecommunications parameter values are allowed to vary. Especially in an urban environment, the services of a wireless node are in an environment full of interference, and the location of both the base transceiver station and the terminal may have an impact on the connection quality achieved by the selected telecommunications parameters. This is why in a QoS negotiation, also the location data of the terminal may be transmitted.

If necessary, the QoS negotiation software of the terminal can preferably also initiate a search for a new network service as described above. For instance, when the requirements of an application exceed the allowed limit values of the parameters of the network connection data transmission service or the network node does not have enough free capacity (in other words, when the QoS negotiation does not produce the desired connection quality), the protocol software of the terminal is able to transmit to the network a service request for finding a new network service. The service request can be implemented using the above standardized attributes. Network nodes, such as base transceiver stations, can reply to the request directly or the request can be sent to a directory server DA or other servers in the network, to which the service data and telecommunications parameters of the network nodes have been collected as described above, for instance. When the software or program procedure of the terminal supporting the applications receives the reply, it can indicate the node or the node alternatives to the user in the user interface and ask the user to accept or reject connecting to the network or to select a network. The terminal or directory server preferably has software which generates a menu of the URL addresses of the network nodes and of the names and values of the attributes. In the latter case, the menu will be moved in the reply from the directory agent DA to the terminal.

Connecting to a new network service is done by transmitting a service request for establishing a telecommunications channel to the selected network node through its access channel (signalling channel). This service request can be equipped with the values of the desired quality attributes or the quality parameters can be sent later, depending on the used negotiation protocol.

The telecommunications parameters received from the directory agent DA can vary greatly depending on the wireless network. Present wireless networks make it possible to join different transmission links by multiplexing the telecommunications channels to the available transmission band so that for each link it is possible to select from the multiplex a required data transmission capacity and quality parameters by means of the attribute values, i.e. the telecommunications parameters. Because the radio frequencies and, thus, the transmission capacity provided by the networks are a limited natural resource, the aim is to use the parameters to achieve an economic use of the transmission capacity provided by the network node. The multiplexing of various data transmission links may be based on a connectionless/packet-type service or a connection-oriented service. Further, in some networks, such the UMTS, an asymmetric transmission can be utilized, in other words, a higher capacity is in use from the base transceiver station to the terminal than from the terminal to the base transceiver station. The amount of asymmetricity may vary according to need (variable duplex symmetry). Each network type affects the data transmission parameters on account of the propagation mechanism of the radio path. An urban or rural environment outdoors and indoor facilities in companies and at home and the transmission capacity requirements of the network set quite different properties for the radio link of networks.

Attributes of a data transmission channel include for instance the bit error ratio, maximum allowed delay of transmission and variable duplex symmetry. The allowed bit error ratio can also be selected by an attribute value.

In yet another embodiment of the invention, the configuration of the terminal comprises the configuration of the radio access part and/or protocol units of the terminal to the radio interface of the new wireless telecommunications network by parameters and/or a configuration program which is downloaded from a server of the wireless network at a higher protocol level, such as the IP, before accessing said new telecommunications network. Such a server can, for instance, be the agent server SA described above or an IP server operating in the node, such as base transceiver station. According to the basic principles of the invention, the terminal IT receives from the directory server DA not only the telecommunications parameters but also connection information (IP address) to the server SA of the desired telecommunications network or node, where the required configuration programs and/or parameters are stored. With this connection information, the terminal IT establishes a higher protocol level (typically IP level) connection (typically IP connection) through another network than said network to the server in question and downloads the necessary programs and/or parameters. After this, the terminal IT configures itself to the radio interface by means of the downloaded programs and/or parameters.

The following describes by way of example some software loadings and configurations performed on the basis of the differences in various telecommunications systems. The radio access interface can be designed so that it meets a few basic properties required for a software-configuring terminal IT. The terminal can configure itself to different networks using a separate radio access unit for each network or by loading a new radio access unit configuration from its own program memory or according to the invention, from a network server. For instance, if different systems use the same bandwidth, the same analogue part can be used in them, but the time-division signal of the TDMA system and the continuous spread-spectrum signal of the CDMA system require their own transmitter and receiver units. The TDMA system, for instance, requires an equalizer, but the CDMA a RAKE receiver. Configuring to different systems is not only loading program modules required by the telecommunications parameters and protocols for use but also configuring the receiver to the radio interface by selecting the correct units for use. The baseband part of the terminal can comprise programmable hardware and a powerful signal processor (DSP). Depending on the access method, the base band part must support different functions, such as a channel equalizer and forward error-correction coding/decoding burst for the TDMA data transmission mode and symbol-type (CS-CDMA) data transmission modes. Systems include different channel coding and decoding methods. The requirements of third-generation mobile systems start from the access network providing mainly data pipes with different data transmission capacities depending on the requirements of the application or service. Several simultaneous connections must be opened and closed for the applications of the terminal. In multimedia, for instance, speech, video and data all require different QoS properties and bit transfer ratio. Application support in the terminal must, therefore, be extended to the selection of an error control scheme, for instance. For instance, the use of the Reed-Solomon code and convolution code and their parameter values or protocols based on retransmission, such as the ARQ (automatic repeat request) can be selected. In interleaving, the interleaving length is determined according to the delay requirements of the applications, for instance. Data services may require an asymmetric transmission link which requires an FDD (frequency division duplex) or TDD (time division duplex) type uplink and downlink system which is scaled as necessary.

According to a preferred embodiment of the invention, a user of a terminal can register at a directory agent DA various service descriptions and connection quality parameters for different wireless networks. This is preferably done so that when the terminal registers itself or after it has registered itself to a user agent UA, it transmits said service descriptions and connection quality parameters to the user agent UA for onward delivery to the directory agent DA. Said service descriptions and connection quality parameters can be stored in the memory of the terminal, whereby the terminal can transmit them automatically to the user agent, or the user of the terminal can set the values in question manually every time it arrives in an area managed by a new directory agent. The user of the terminal can, for instance, set different personal settings for certain often used services and limit the cost of the used wireless connection by setting a maximum value for the used data transmission rate and other connection quality parameters. It is possible to prioritize for different services wireless networks used for data transmission in such a manner that a wireless video service, for instance, is primarily provided to the terminal through a wireless local area network WLAN, and if this is not possible, secondarily through a DAB network and only lastly, if the terminal is not in. the area of the above-mentioned networks, through a cellular radio network GSM. The directory agent DA stores terminal-specific network and service settings which the user of a terminal can, as necessary, change by registering new service descriptions according to the procedure described above. The directory agent DA then knows the terminal-specific personalized network and service settings and the service request of the terminal can preferably only comprise the type of the desired service. The directory agent DA then links the service type to the stored network and service settings and returns connection establishment data according to said settings through the user agent UA to the terminal.

In broadcasting networks, digitalization, the development of compression techniques and the introduction of microwave frequencies have brought about a trend in which the number of both broadcasting networks and channels will increase. At the same time, broadcasting networks will slowly become bi-directional. This trend brings along problems for the users of the broadcasting networks in finding the networks and connecting to them. The method of the invention can also solve these problems.

According to the invention, the transmitters of broadcasting networks are connected to a fixed network NW in which transmitter-specific service agents SA register and update network services at directory agents DA. A terminal IT makes service requests directed to the broadcasting networks through a user agent UA. A service request can be such that it comprises the configuration data of all broadcasting networks operating in the area and of their services or the request can be limited to apply to a part of them. The configuration data returned by the directory agent DA through the user agent UA can preferably be stored in the memory of the terminal IT, whereby the terminal knows the configuration data of all available services and can, on the basis of them, connect to a new service whenever required.

In the above, the invention has been described by way of example and in a simplified manner by limiting it to three wireless networks, the cellular radio network GSM, wireless local area network WLAN and digital audio broadcasting network DAB. It is obvious that the invention can be applied to the management of any wireless network services and telecommunications parameters. It is obvious to a person skilled in the art that while technology advances, the basic idea of the invention can be implemented in many different ways. The invention and its embodiments are thus not limited to the above examples, but may vary within the scope of the claims.

The invention claimed is:

1. A method of managing telecommunications parameters in a telecommunications system which comprises nodes of at least two different wireless telecommunications networks and a terminal which is arranged to establish a wireless data transmission connection to said nodes comprising the steps of:
   connecting said nodes of at least two different wireless telecommunications networks to a fixed network which comprises a server configured to store services and telecommunications parameters supported by the nodes of said telecommunications networks, said terminal making a service request through one of said nodes to said server; and
   transmitting to the terminal the telecommunications parameters of the node providing the service according to the request.

2. A method as claimed in claim 1 by further comprising transmitting the service request made by the terminal to said server by program means, transmitting the services and the telecommunications parameters provided by said nodes to said server by program means, and transmitting the telecommunications parameters of the node providing the service according to said service request from said server to said terminal by program means.

3. A method as claimed in claim 1 or 2, further comprising establishing a connection from said terminal to said node by means of said telecommunications parameters.

4. A method as claimed in claim 1 wherein a method includes the further step of:
   transmitting from said terminal to the server network-specific service definitions which compromise defined connection quality parameters for each service, and
   storing said network-specific service definitions in said server.

5. A method as claimed in claim 4, further comprising checking the telecommunications parameters of the node providing the service according to the service request of the terminal from the network-specific service definitions, and
   transmitting from said server the telecommunications parameters of said node in response to the service request made by the terminal only comprising substantially the service type.

6. A method as claimed in claim 1 wherein the terminal configures itself by program to a radio interface by means of said telecommunication parameters.

7. A method as claimed in claim 1, wherein the terminal receives from said server a connection or connection data to a second server which contains software modules and parameter values of the desired new wireless telecommunications network, the terminal downloads from said second server over an Internet protocol connection established through the old wireless telecommunications network configuration software modules and parameter values with which the terminal configures itself to a radio interface of the desired new wireless telecommunications network.

8. A method as claimed in claim 1, wherein that said telecommunications parameters contain the limit values of the connection quality parameters supported by the node.

9. A method as claimed in claim 1, wherein the connection quality negotiation protocol software of the terminal is configured to operate according to said telecommunications parameters.

10. A method as claimed in claim 1, wherein the connection quality negotiation protocol software of the terminal is configured to operate according to said telecommunications parameters.

11. A method as claimed in claim 1, wherein a connection request sent by the terminal to the node during connection establishment is formed according to said telecommunications parameters.

12. A method as claimed in claim 1, wherein communication between the terminal and the server and preferably between the nodes and the server is based on a data transmission protocol independent of said wireless telecommunications networks.

13. A method as claimed in claim 1, wherein the user initiates the service request and preferably defines the requested service or the telecommunications parameters in the user interface of the terminal.

14. A method as claimed in claim 1, wherein on the basis of the information received from the server, information on the available telecommunications networks, services, telecommunications parameters and/or connection quality parameters is shown on the user interface of the terminal.

15. A method as claimed in claim 1, wherein the connection quality negotiation between the terminal and the node is performed using a universal negotiation protocol.

16. A method as claimed in claim 1, wherein the service request sent by the terminal also defines the location of the terminal.

17. A telecommunications system which comprises nodes of at least two different wireless telecommunications networks and a terminal which is arranged to establish a wireless data transmission connection to said nodes, wherein said nodes of at least two different telecommunications networks are connected to a fixed network which comprises a server for storing services and telecommunications parameters supported by said nodes of the telecommunications networks, said terminal is arranged to make a service request through one of said nodes to said server, and said server is arranged to transmit to the terminal the telecommunications parameters of the node providing the service according to the service request.

18. A telecommunications system as claimed in claim 17, wherein said fixed network comprises program means for transmitting the service request made by the terminal to said server, program means for transmitting the services and telecommunications parameters transmitted by said nodes to said server, and program means for transmitting the telecommunications parameters of said node providing the service according to the service request from said server to said terminal.

19. A telecommunications system as claimed in claim 17 or 18, wherein said terminal is arranged to establish a connection to said node by means of said telecommunications parameters.

20. A telecommunications system as claimed in claim 17, wherein said terminal is arranged to transmit to the server network-specific service definitions which comprise defined connection quality parameters for each service, and said server is arranged to store said network-specific service definitions.

21. A telecommunications system as claimed in claim 20, wherein said server is arranged to check the telecommunications parameters of the node providing the service according to the service request of the terminal from the stored network-specific service definitions, and to transmit the telecommunications parameters of said node in response to the service request made by the terminal only comprising substantially the service type.

22. A system as claimed in claim 17, wherein said telecommunications parameters contain the limit values of the connection quality parameters supported by the node.

23. A system as claimed in claim 22, wherein the terminal configures itself to operate within said quality parameters when initiating connection establishment to the node in question.

24. A system as claimed in claim 17, wherein the connection quality negotiation protocol software of the terminal configures itself to operate according to said telecommunications parameters.

25. A system as claimed in claim 17, wherein the terminal (IT) selects automatically or assisted by the user a suitable node on the basis of the received telecommunications parameters.

26. A system as claimed in claim 17, wherein communication between the terminal and the server, and preferably between the nodes and the server, is based on a data transmission protocol independent of said wireless telecommunications networks.

27. A system as claimed in claim 17, wherein the connection quality negotiation between the terminal and the node is based on a universal negotiation protocol.

28. A system as claimed in claim 17, wherein said server is arranged to provide the terminal a connection or connection data to a second server which comprises software modules and parameter values of the desired new wireless telecommunications network, the terminal is arranged to download from said second server over the Internet protocol connection established through the old wireless telecommunications network configuration software modules and parameter values with which the terminal configures itself to a radio interface of the new desired wireless telecommunications network.

29. A system as claimed in claim 17, wherein the service request sent by the terminal also defines the location of the terminal.

30. A server which is connected to at least two different wireless networks whose nodes provide wireless data transmission services for wireless terminals, wherein the server is arranged to store data and telecommunications parameters of the services supported by said nodes of the telecommunications networks, the server is responsive to a service request sent by the terminal for transmitting the telecommunications parameters of at least one node providing the service or services according to the service request, the terminal being able to establish a connection to said node on the basis of the parameters.

31. A server as claimed in claim 30, wherein the server is arranged to communicate with said nodes to collect said service data and telecommunications parameters.

32. A server as claimed in claim 30, wherein the server collects said service data and telecommunications parameters by means of registrations made by the nodes to the server.

33. A server as claimed in claim 30, 31 or 32, wherein communication between the terminal and the server and preferably between the nodes and the server is based on a data transmission protocol independent of said wireless telecommunications networks.

34. A server as claimed in claim 30, wherein said server is arranged to provide to the terminal a connection or connection data to a second server which contains software modules and parameter values of the desired new wireless telecommunications network, which the terminal downloads over the Internet protocol connection established through the old wireless telecommunications network to configure itself to a radio interface of the desired new wireless telecommunication network.

35. A server as claimed in claim 30, wherein the service request sent by the terminal also defines the location of the terminal.

36. A terminal capable of operating in two or more wireless networks, wherein the terminal is arranged to transmit a service request to a server which stores service data and telecommunications parameters supported by nodes of said at least two telecommunications networks, the terminal is arranged to configure itself and/or establish a connection to one of said nodes on the basis of the telecommunications parameters received from said server.

37. A terminal as claimed in claim 36, wherein said telecommunications parameters contain the limit values of connection quality parameters supported by the node.

38. A terminal as claimed in claim 37, wherein the terminal configures itself to operate within said quality parameters when initiating connection establishment to the node in question.

39. A terminal as claimed in claim 36, wherein a connection quality negotiation protocol software of the terminal configures itself to operate according to said telecommunications parameters.

40. A terminal as claimed in claim 36, wherein the terminal selects a suitable node automatically on the basis of the received telecommunications parameters.

41. A terminal as claimed in claim 36, wherein communication between the terminal and the server is based on a data transmission protocol independent of said wireless telecommunications networks.

42. A terminal as claimed in claim 36, wherein the terminal comprises a user interface in which the user initiates a service request and preferably defines the requested service or telecommunications parameters.

43. A terminal as claimed in claim 36, wherein the terminal comprises a user interface in which the terminal, on the basis of the data received from the server, displays to the user the information on the available telecommunications networks, services, telecommunications parameters and/or connection quality parameters.

44. A terminal as claimed in claim 43, wherein the terminal configures itself and establishes a connection to a node accepted by the user.

45. A terminal as claimed in claim 36, wherein connection quality negotiation between the terminal and the node is based on a universal negotiation protocol.

46. A terminal as claimed in claim 36, wherein the terminal receives from said server a connection or connection data to a second server which contains software modules and parameter values of the desired new wireless telecommunications network, and the terminal is arranged to download from said second server over the Internet protocol connection established through the old wireless telecommunications network configuration software modules and parameter values with which the terminal configures itself to the radio interface of the new desired wireless telecommunications network.

47. A terminal as claimed in claim 36, wherein the service request sent by the terminal also defines the location of the terminal.

48. An apparatus comprising a server of a wireless telecommunications network, wherein the server contains software modules and parameter values of the wireless telecommunications network, the server provides to a wireless terminal over an Internet protocol connection established through a second wireless telecommunications network the possibility to download configuration software modules and parameter values with which the terminal configures itself to a radio interface of the wireless telecommunications network.

49. An apparatus as claimed in claim 48, wherein the apparatus is located in a node of the wireless telecommunications network.

* * * * *